(12) United States Patent
Holladay, III et al.

(10) Patent No.: US 6,534,985 B2
(45) Date of Patent: Mar. 18, 2003

(54) MODULAR ELECTROMAGNETIC SENSING APPARATUS HAVING IMPROVED CALIBRATION

(75) Inventors: John Scott Holladay, III, Toronto (CA); James Leonard Corbett Lee, Sunderland (CA)

(73) Assignee: Geosensors Inc., Toronto (CA)

(*) Notice: Subject to any disclaimer, the term of this patent is extended or adjusted under 35 U.S.C. 154(b) by 0 days.

(21) Appl. No.: 09/736,406

(22) Filed: Dec. 15, 2000

(65) Prior Publication Data

US 2002/0043976 A1 Apr. 18, 2002

Related U.S. Application Data

(60) Provisional application No. 60/172,156, filed on Dec. 17, 1999.

(51) Int. Cl.[7] .................. G01V 3/10; G01V 3/165; G01V 13/00
(52) U.S. Cl. .................. 324/334; 324/329; 324/202
(58) Field of Search .................. 324/329, 334–337, 324/202

(56) References Cited

U.S. PATENT DOCUMENTS

| | | | | |
|---|---|---|---|---|
| 3,168,694 A | * | 2/1965 | Slattery | 324/334 |
| 3,392,384 A | * | 7/1968 | Wesch | 324/329 X |
| 3,581,194 A | * | 5/1971 | Tegholm | 324/334 |
| 3,609,522 A | * | 9/1971 | Hutchins et al. | 324/334 |
| 4,070,612 A | * | 1/1978 | McNeill et al. | 324/334 |
| 4,258,321 A | * | 3/1981 | Neale, Jr. | 324/334 |

* cited by examiner

Primary Examiner—Gerard R. Strecker
(74) Attorney, Agent, or Firm—Nancy E. Hill; Hill & Schumacher

(57) ABSTRACT

An electromagnetic sensing apparatus which has an electromagnetic transmitter, at least one receiver device, at least one calibration device, a switch and a processor. The transmitter generates a transmitter signal. The receiver device is spaced from the transmitter, senses an electromagnetic field proximate thereto and generates a receiver signal. The calibration device senses an electromagnetic field proximate thereto and generates a calibration signal. The calibration device is positioned such that the distance between the transmitter and the receiver device is greater than the distance between the transmitter and the calibration device. The switch is connected between the receiver device and the calibration device. The processor includes a first input for receiving a signal from one of the at least one receiver device and the calibration device and a second input for receiving a signal from the switch and compares the first input and second input and monitors distortions in the transmitter signal.

26 Claims, 14 Drawing Sheets

MODULAR ELECTROMAGNETIC SENSING APPARATUS HAVING IMPROVED CALIBRATION

CROSS REFERENCE TO RELATED PATENT APPLICATION

This patent application relates to U.S. Provisional Patent Application Ser. No. 60/172,156 filed on Dec. 17, 1999 entitled MODULAR ELECTROMAGNETIC SENSING APPARATUS.

FIELD OF THE INVENTION

This invention relates to electromagnetic sensing apparatus and in particular to a method and apparatus for the non-contacting measurement of earth material electrical and magnetic properties with respect to depth below surface and position.

BACKGROUND OF THE INVENTION

Portable devices currently available for in-situ direct estimation of nearby earth materials' apparent conductivity will be referenced in the following as terrain conductivity meters (TCM's) and multi-frequency EM sounders (MEMS). Extensions to the TCM approach, which will be referenced as the ground conductivity meter (GCM) and array conductivity meter (ACM), improve aspects of TCM operation.

TCM's

The first devices which could be described as TCM's were described by Doll (Doll, H. G. 1949, Introduction to Induction Logging and Application to Logging of Wells Drilled with Oil Base Mud, J. Pet. Technol. 1, pp 148–162) in a borehole context and Howell (Howell, M., 1966, A Soil Conductivity Meter, Archaeometry 9, pp 20–23) in a shallow soil conductivity measurement context. Examples of commercially-available TCM's include the Geonics Ltd. EM-31, EM-34 and EM-38 and the Geoftzyka CM-031. These devices use the Low Induction Number Approximation (LINA) to estimate the apparent conductivity of the earth materials over a range of depths by a linear scaling operation from the component of the reflected EM signals which are in quadrature (i.e. at a 90° phase shift) with the primary field emitted by the sensors transmitter coil. The component of the EM measurement arising from signals in phase with the primary field from these devices may also be interpreted, with some effort, in terms of apparent conductivity, as well as the apparent magnetic permeability of the earth materials under test. The terms apparent conductivity and apparent magnetic permeability are defined below.

Existing TCM's incorporate a transmitter coil transmitting a sinusoidal signal at a single stable frequency (e.g. approximately 10 kHz for the EM-31) such that the LINA holds, i.e. that the following inequality is true:

$$[(\omega\mu\sigma_0)^{1/2}\rho]<0.5$$

where $\omega$ is the operating frequency in radians/sec, $\mu$ is the magnetic permeability of the earth in henrys/metre, $\sigma_0$ is the conductivity of the earth in Siemensim, and $\rho$ is the separation in metres between the transmitter and receiver coils (as described further below).

In a TCM, a receiver coil is located at a distance $\rho$ from the transmitter coil and substantially coplanar with the transmitter coil. There may or may not be a preamplifier located near this receiver coil to increase its effective output signal level. The peak moment (transmitter coil current times number of turns time area of one turn) of the transmitter coil's magnetic field is such that an acceptable signal to noise ratio (SNR) can be obtained at the receiver.

TCM's also incorporate electronics which can analyse the signal picked up at the receiver coil into components in phase and in quadrature (90 degrees out of phase) with the transmitted field. The quality of calibration of the output of this process and its stability are important factors in the utility of the instrument. These electronics also include circuits and/or software which convert the measured quadrature component into an apparent resistivity using the LINA relationship as stated in McNeill (McNeill, J. D., 1980, Electromagnetic Terrain Conductivity Measurement at Low Induction Numbers, Technical Note TN6, Geonics Limited, Mississauga, Canada) after Wait (Wait, J. R., 1962, A Note on the Electromagnetic Response of a Stratified Earth, Geophysics 27, pp 382–385.), i.e.

$$\sigma_a=4/(\omega\mu\rho^2)*(H_s/H_p)_{quadrature}$$

The fundamental unit of apparent conductivity under the MKS system of units is Siemensimeter (S(m), although most if not all TCM's present their quadrature data in terms of milliSiemensim. In situations displaying horizontally-layered geology, the apparent conductivity represents a weighted average of the earth materials' conductivity in the vicinity of the sensor. A commonly-accepted rule-of-thumb depth of investigation (DOI) has been defined by McNeill as 1.5 times the transmitter-receiver separation for the horizontal coplanar configuration and 0.75 times this separation for the vertical coplanar configuration, corresponding to a cumulative response value of approximately 30%. Using the same 30% value for the perpendicular configuration's cumulative response yields a DOI for this configuration of approximately 0.5 times the transmitter-receiver separation.

A separate data logging device is typically provided which can acquire, store and display the analog outputs of typical commercial TCM's on demand or at a preset sampling rate.

The Transmitter and Receiver coils are typically installed near the ends of a tubular boom or other support structure, while the electronics and data logging device are mounted in a package near the central point of the support structure. The boom in the EM-31 is designed to be partially disassembled for shipping, with the two outer portions attached via couplings to the central portion of the boom, which is affixed to the electronics package. Short-offset systems like the EM-38 are housed in unitary support structures which incorporate the receiver electronics. The EM-34 does not incorporate a rigid housing joining the transmitter and receiver.

The orientation of the Transmitter and Receiver coils is such that the axis of each coil is approximately vertical when the instrument is held in an upright position (the Horizontal Coplanar orientation).

TCM's incorporating horizontal coplanar coil geometries can be rotated 90 degrees about a line joining the Transmitter and Receiver coils to place the coils into the Vertical Coplanar orientation, wherein the axes of the coils are horizontal. As described above, this approximately halves the effective DOI for the system, and allows the user to investigate vertical variations In the conductivity structure of the earth.

The principal shortcomings of the TCM are its single transmitter-receiver coil pair, which doubles the measurement time per station if two depths of investigation are desired at each site, its substantial weight (12.4 kg for the EM-31), its weak joint structure (for the EM-31), which permits substantial sag and flexibility in the boom when assembled, and its bulky packaging-which generates uncomfortable magnitudes and directions of pressure on the operator's shoulder. TCM's which rely exclusively on the LINA formula quoted above for estimation of earth material conductivity will generate erroneous values when used under very conductive conditions.

MEMS

A related class of non-contacting multi-frequency electromagnetic sounders (MEMS) used for near-surface earth material investigation measure the variation in the instruments electromagnetic coupling with earth materials as a function of frequency. Examples of such instruments include airborne electromagnetic (AEM) sensors developed by various companies over the years, including Barringer Research, Dighem, Geotech, Geoterrex, Geophex, and Aerodat, and ground systems such as the Apex Double-Dipole™ and the Geophex GEM-2™ and Geophysical Survey Systems' GEM-300™ which operate in the range 330 to 20,000 Hz.

Conventional AEM sensors have been thoroughly described in the literature (e.g, Palacky and West, 1987). Over the last fifteen or twenty years, efforts have been made to increase the quantitative capabilities of some AEM sensors through improvements to calibration methodologies and the introduction of electronic calibration methods. These efforts achieved encouraging, though not definitive, results. The multi-frequency, rigid-boom approach used in helicopter electromagnetics (HEM) received the most attention in terms of calibration. In their simplest form, HEM sensors incorporate a linear coil array consisting of a transmitter, a receiver of effective area (turns times single-turn area) A, and a bucking coil possessing an effective area $A\rho^3$, where $\rho$ is the relative position of the center of the bucking coil between the center of the transmitter (at $\rho=0$) and the center of the receiver coil (at $\rho=1$). The bucking coil is connected in opposition to the receiver coil, so that the signal induced in the combined receiver-bucking coil circuit by the primary field generated by the transmitter is reduced to approximately zero. The secondary EM signal, due to eddy currents induced in nearby electrically conductive media by the primary field, is the quantity to be measured by the sensor array. This bucking method reduces the dynamic range requirements placed on the amplification and signal-processing electronics used to acquire and analyse the secondary EM signal.

The method, as described to this point, is the same for narrowband or wideband HEM sensors. Narrowband sensors transmit sinusoidal signals at one frequency per set of transmitter, receiver and bucking coils, so that multiple-frequency measurements require multiple sets of these coils. Wideband sensors broadcast a more complicated waveform, which includes many frequency components. The amplitude and phase of the secondary signal (defined with respect to the amplitude of the primary signal at the receiver location) are, in most narrowband implementations, measured through analogue or digital synchronous demodulation of the signal using analog signal processors, where the phase reference for the demodulation process is obtained from a reference coil positioned near the transmitter coil. The amplitude information present in the phase reference signal is discarded by conventional HEM signal processor units.

In wideband sensors, the bucked signal is typically digitized and either stacked (i.e. each period of the waveform is added together to yield a stacked waveform as described by Becker and Cheng (1987), or stored in memory for later analysis. A reference waveform representative of the primary field is also normally stacked or stored. The stacked or stored waveforms are then subjected to Fourier deconvolution, in which the Fourier transform components of the signal waveform are divided by the corresponding components of the reference waveform. For example, in the GEM-300™ ground EM sensor, the bucked signal and the reference (obtained from the bucking coil) are digitised into parallel data streams. The EM response at each operating frequency is computed through convolution with cosine and sine data series at that frequency (effectively the computation of Discrete Fourier Transformation coefficients for these frequencies), followed by correction for amplifier gains, coil geometry and the amplitude and phase of the transmitted signal measured using the reference signal (Won, I. J., D. A. Keiswetter, G. R. A. Fields, and L. C. Sufton, 1996, GEM-2, A New Multifrequency Electromagnetic Sensor, JEEG 1, pp. 129–137). The resulting EM response data are either recorded directly or converted to an apparent conductivity value through a transformation relating EM response to the product of apparent conductivity and frequency (Won et al, 1996). The GEM-300™ instrument reportedly suffers from deficiencies in calibration and zero-level stability, which make it difficult to use their measurements for quantitative layered-earth interpretation (Nyquist, Sageep reference). It also lacks the frequency range necessary for unambiguous resolution of earth material property layering within the first two metres below surface except in extraordinarily conductive conditions (McNeill, Geonics TN30). For example, at an operating frequency of 1 MHz (about 50 times higher than its actual maximum frequency), such an Instrument could not resolve layered structures smaller than about 1 metre, even in extremely conductive 0.2 S/m earth materials.

GCM

The ground conductivity meter as defined here is an extension to the asic horizontal-coplanar geometry TCM through the addition of a second receiver coil mounted at right angles to the first one so that this axis of this second coil precisely intersects the transmitter coil. An instrument incorporating such a receiver coil in addition to a horizontal-coplanar (HCOP) receiver coil is the subject of a Canadian Patent 2,142,546 issued Apr. 13, 1999 to Richard S. Taylor and entitled Apparatus and Method for Sounding the Earth. This alternative transmitter-receiver orientation is known as the Perpendicular Loop configuration (PLC). The output of this PLC coil is sensitive to ground conductivity variations to a depth approximately one-third of that to which the horizontal coplanar coils are sensitive for a horizontally-stratified earth material properties distribution. By using both the HCOP and PLC configuration outputs, one can simultaneously estimate ground conductivity for two DOI's. The first DOI extends to 1.5 times the transmitter-receiver coil spacing for the horizontal coplanar coil pair, while the second DOI extends to 0.5 times the coil separation for the perpendicular coil pair.

These simultaneous measurements permit continuous EM profiling at two depths of exploration, an important improvement in terms of productivity over the TCM. Another advantage of the PLC extension is that adding a second receiver coil and its attendant electronics to a single-transmitter instrument is more efficient in terms of power usage and weight, providing a competitive advantage over devices which seek to monitor different depth ranges using multiple transmitters and receivers via MEMS technology.

SUMMARY OF THE INVENTION

The term Earth materials should be interpreted as inclusive of materials including but not limited: to soils; rocks;

minerals; ores; ice; and solvents such as water, brine, pore fluids, ammonia and methane; located on or in the earth or extraterrestrial bodies including planets, moons, asteroids or comets. Earth materials may be characterised by their electromagnetic (EM) properties, i.e. their electrical conductivity and permittivity, and their magnetic permeability. The distribution of these EM properties with respect to depth and position may be interpreted in terms of more geologically or geotechnically useful quantities, including composition, porosity, degree of fluid saturation, concentration of salts or other conductive species in the solvent, and the concentration of magnetically permeable materials.

This invention provides an improved means for quantitative estimation of the electromagnetic properties of earth materials with a lightweight, self-contained apparatus. In some embodiments the apparatus is capable of stable extended operation at low power levels, while in others low-power operation may be sacrificed for the sake of reduced noise levels or extended spectral range.

The requirement for quantitative measurement of earth material properties arises in many applications, most of which lie in the fields of geotechnical engineering and environmental assessment, mining, or industrial processes. The invention will improve the quality and acquisition rate of measurements of the electromagnetic properties of near-surface earth materials, buried objects, bodies, voids or other agglomerations of material of natural or technological origin possessing a contrast between their electromagnetic properties and the surrounding material.

Some particular applications, which may include either surface-based or low-altitude airborne measurements, include:

rapid profiling and display of depth-conductivity profiles;

measurement of the electrical conductivity and thickness of floating ice (or other solids) and/or of the underlying water (or other conducting fluid);

monitoring of soil and/or groundwater salinity for agricultural purposes;

monitoring of near-surface geology, moisture content, salinity and electrolyte pollution of swamps, marshlands and wetlands;

searching for objects such as vehicles or structures buried by natural disasters such as avalanches and landslides;

detection of unexploded ordnance;

detection of underground or underwater storage tanks, pipes, transformers and other highly conductive structures; and detection of archaeological features such as walls, pits, hearths, floors, postholes, middens, mounds and artifacts;

Accordingly to one aspect of the invention, an electromagnetic sensing apparatus comprising an electromagnetic transmitter, at least one receiver device, at least one calibration device, a switch and a processing means. The electromagnetic transmitter generates a transmitter signal. The receiver device is spaced from the transmitter, senses a receiver local electromagnetic field proximate thereto and generates a receiver signal. The calibration device senses a calibration local electromagnetic field proximate thereto, generates a calibration signal. The calibration device is positioned such that the distance between the transmitter and the receiver device is greater than the distance between the transmitter and the calibration device. The switch is connected between the receiver device and the calibration device. The processing means includes a first input for receiving a signal from one of the receiver signal and the calibration signal and a second input for receiving a signal from the switch. The processing means compares the first input and the second input and monitors distortions in the transmitter signal. The sensing apparatus may include a plurality of receiver devices in a variety of different configurations.

Accordingly to another aspect of the invention, an electromagnetic sensing apparatus comprises an electromagnetic transmitter, a first receiver device, a second receiver device and a processing means. The electromagnetic transmitter generates a transmitter signal. The first receiver device is spaced from the transmitter, senses a first receiver local electromagnetic field proximate thereto and generates a second receiver signal. The second receiver device is spaced from the first receiver device, senses a second receiver local electromagnetic field proximate thereto and generates a second receiver signal. The processing means has a first input for receiving the first receiver signal and a second input for receiving the second receiver signal. The processing means compares the first input and the second input and monitors distortions in the transmitter signal.

Accordingly to a further aspect of the invention, a method of analysing data from electromagnetic sensing apparatus comprises a plurality of steps. A receiver signal from a receiver device is received and converted into a complex receiver signal. Similarly a calibration signal from a calibration device is received and the converting signal to a complex calibration signal. The ratio of the complex receiver signal to the complex calibration signal is adjusted for the signal processing components to produce a processing adjusted complex ratio. The processing adjusted complex ratio is adjusted for the effective areas of the receiver device and the calibration device to produced an area adjusted complex ratio. The area adjusted complex ratio is adjusted for a distance between the receiver device and a transmitter and the distance between the calibration device and the transmitter to produce a calibrated field coupling ratio.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

Figure 1:
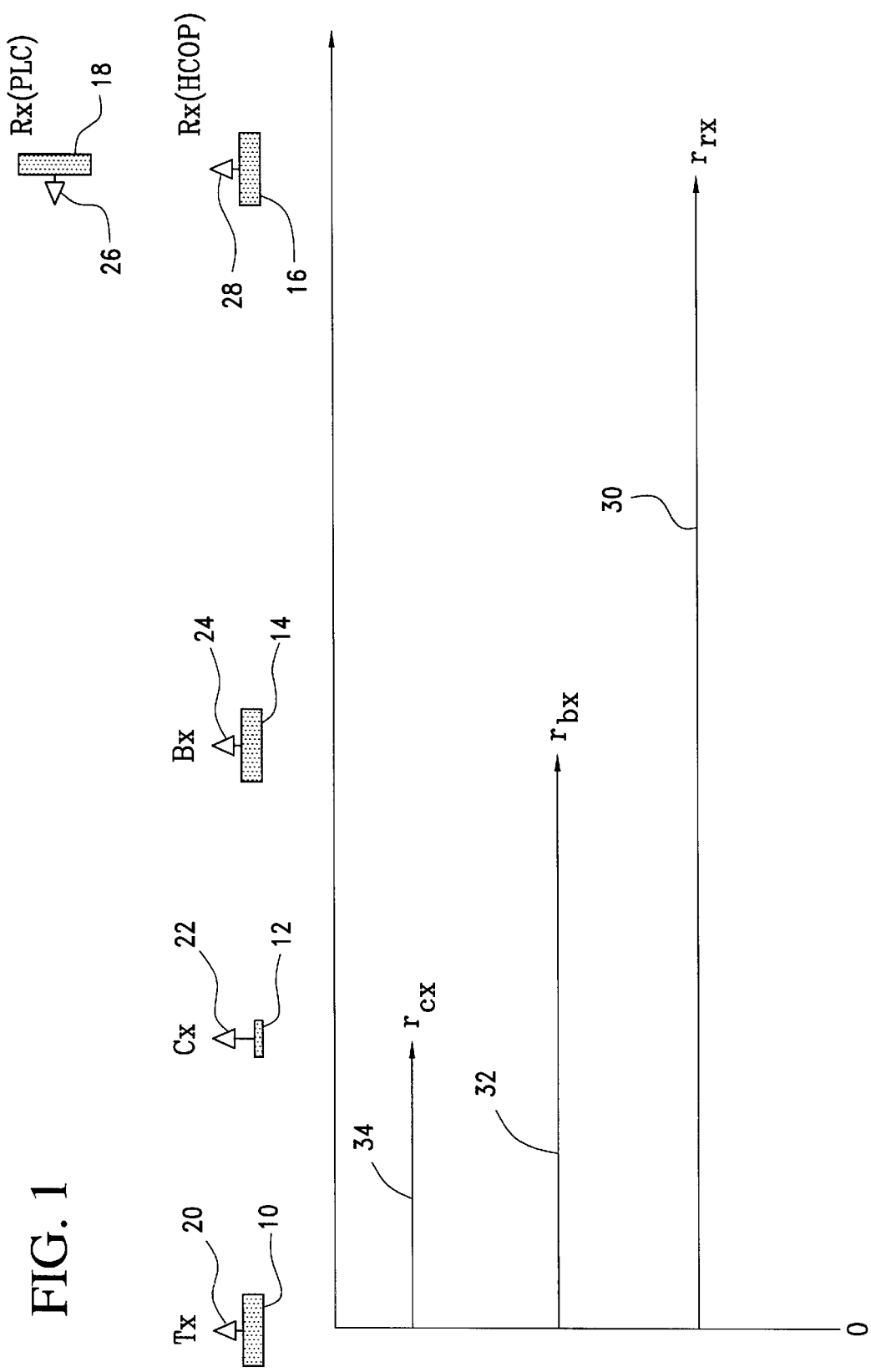
FIG. 1 is a schematic representation of the horizontal positioning of the coils in the electromagnetic sensing apparatus of the present invention.

FIG. 1 depicts a verticaldipole transmitter coil (Tx) 10, a calibration coil (Cx) 12, an optional bucking coil (Bx) 14, and a pair of receiver coils Rx (PLC) 16 and Rx (HCOP) 18. Each of the coils has an axis specifically a transmitter axis 20, a calibration axis 22, a bucking axis 24, a receiver PLC axis 26 and a receiver HCOP axis 28 respectively. Similarly each of these has an effective center. The effective center of a receiver type device, including the Cx 12, Bx 14, Rx PLC 16 and Rx HCOP 18, may be defined as the centroid of the sensitive region of the receiver device with respect to the component of electromagnetic field intensity being sensed by the device. The sensitive region is that area or volume of the receiver device which is sensitive to the intensity of the electromagnetic field in the vicinity of the receiver device. It will be appreciated by those skilled in the ad that the centroid of the sensitive region is typically substantially coincident with the geometrical center of the sensitive region. The effective center of a transmitter device may be defined as the geometrical center of the transmitter device.

The HCOP Rx 16 coil is coplanar with the Tx 10 or their effective centres are coplanar and separated from it by $r_{rx}$ 30. The perpendicular loop coil (PLC) 18 is oriented perpendicular to the Tx-Rx plane, with its axis 28 directed toward the transmitter coil 10. The PLC 18 and HCOP 16 coils may be concentric or offset. If they are offset, the distance between the Tx to the PLC is $r_{rxp}$ which may be larger or smaller than $r_{rx}$. If the Bx coil is present, it is located at $r_{bx}$ 32. The distance between the calibration coil 12 and the transmitter 10 is $r_{cx}$ 34 and is less than $r_{rx}$ 30

Figure 2:
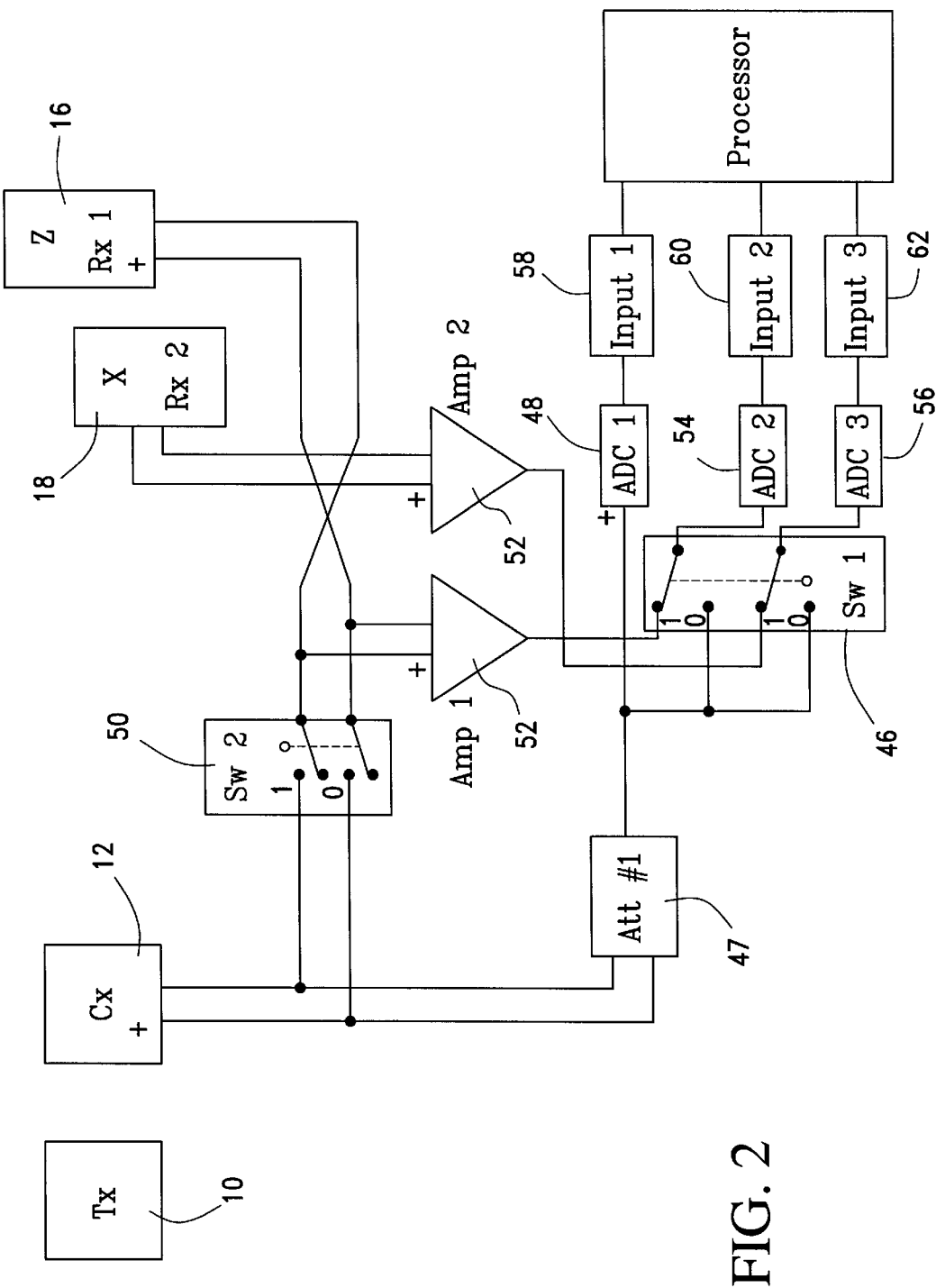
FIG. 2 is simplified circuit diagram of the electromagnetic sensing apparatus of the present invention.

FIG. 2 schematically depicts the first embodiment of the calibration apparatus. The Cx coil 12 supplies a signal through an anti-alias filter 47 to certain poles on Switch #1 46 and directly to an analog to digital converter (ADC) 48. The output of this ADC is called the Calibration data stream 58 or input 1. Switch #1 permits the Cx signal to be applied to the other ADC's when required in order to establish their calibration factors relative to ADC #1.

A separate pair of leads runs to Switch #2 50 (if present), which is normally open, but when closed places the Cx coil 12 in opposition to the Rx coil 16. Switch #2 50 may be present in the circuit only during initial calibration of the system, when it may be used to position the Cx 12 and/or Rx 16 coils and/or to adjust the parameters of the Cx 12 and/or Rx 16 coils, such that the combined signal from the Rx 16 and Cx 12 due to direct pickup of the Tx 10 field is at a minimum. This methodology allows the Calibration signal emanating from the Cx 12 to be adjusted so as to generally match the amplitude and phase of the Rx signal due to direct pickup of the Tx field.

Two receiver coils, labelled Z Rx 18 and X Rx 16, are connected via an amplifier and anti-alias filter 52 to certain poles on Switch #1 46, such that in position 1 of the switch they are connected through to the second and third ADC's 54 and 56 respectively. The corresponding output data streams of these ADC's are called the Z Signal 60 and X signal 62, or inputs 2 and 3 respectively.

Figure 3:
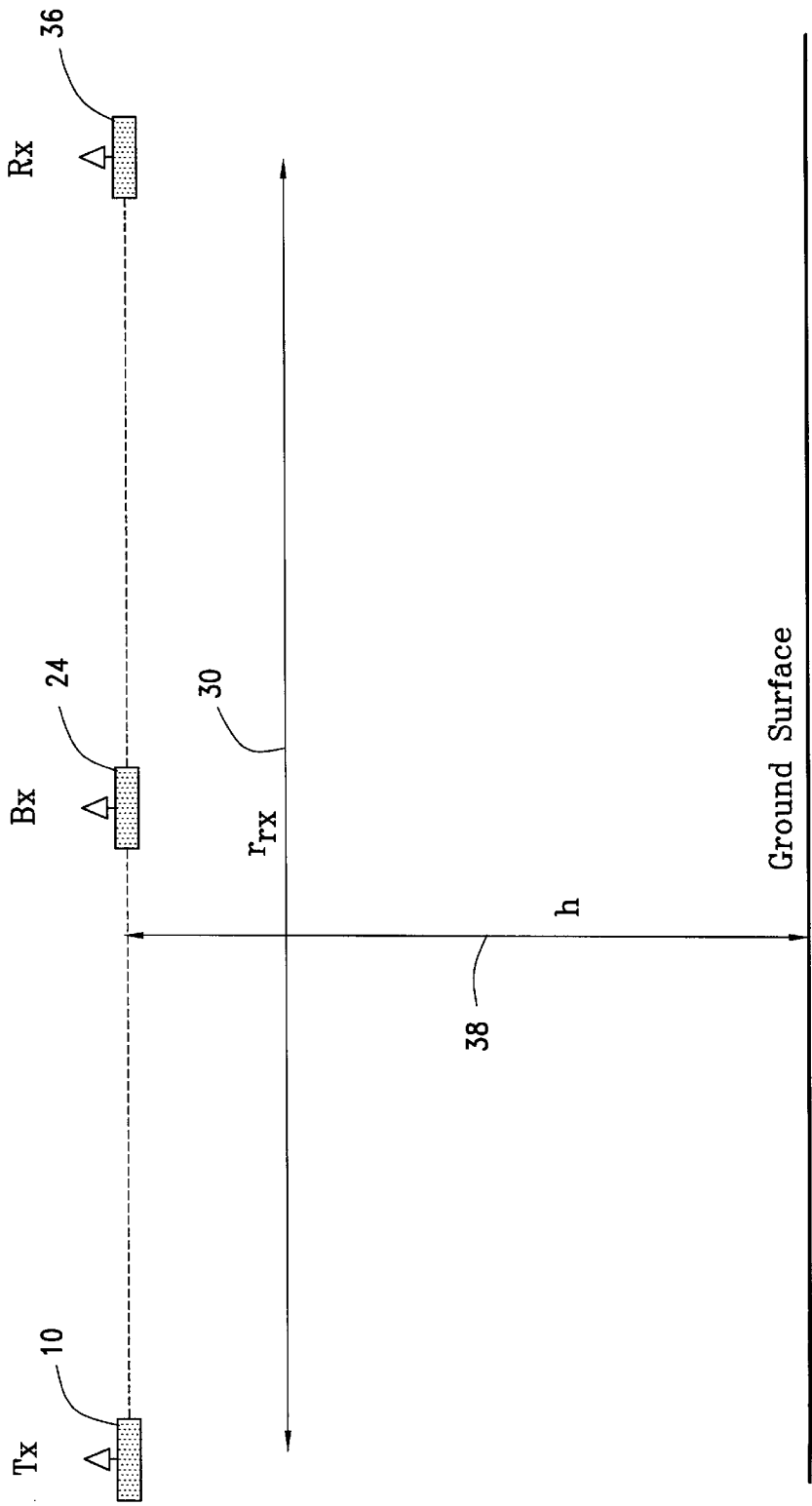
FIG. 3 is a schematic representation of the electromagnetic sensing apparatus of the present invention relative to the ground.

FIG. 3 shows the relationship between the Tx 10, Bx 24 (if present) and Rx coils 36 in a Terrain Conductivity Meter (TCM). In a Ground Conductivity Meter (GCM), the single receiver coil labelled Rx 36 would be replaced by a pair of coils 16 and 18 such as those shown in FIG. 2. The array, of length $r_{rx}$ 30, is normally used with its long axis horizontal at a height h 38 above the ground surface.

Figure 4:
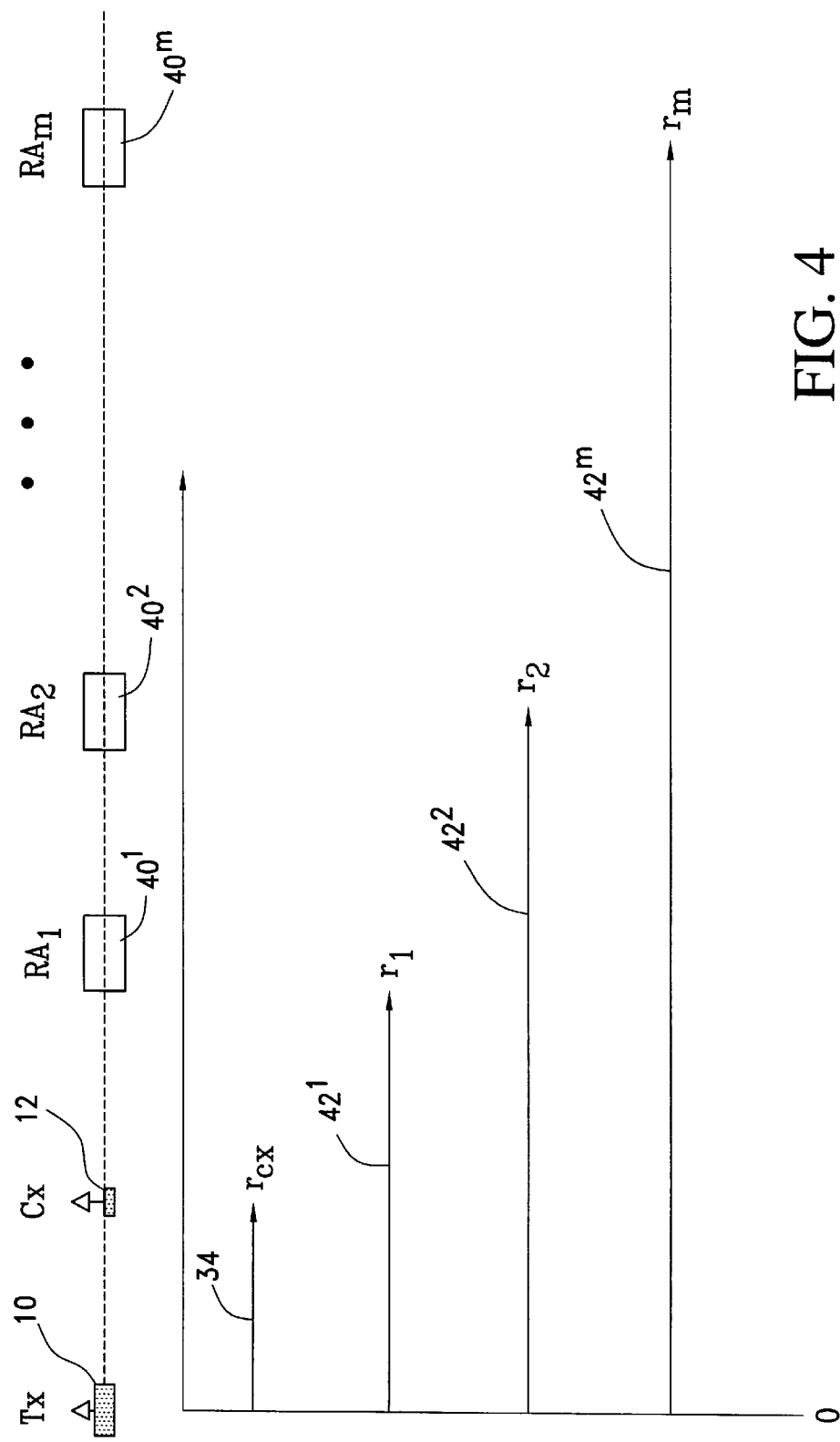
FIG. 4 is a schematic representation of the horizontal positioning of the coils in an alternate embodiment of the electromagnetic sensing apparatus of the present invention including multiple Receiver Assemblies.

FIG. 4 depicts a vertical-dipole transmitter coil (Tx) 10, a calibration coil (Cx) 12, and multiple receiver assemblies $RA_1 40^1$, $RA_2 40^2$, and so on to $RA_m 40^m$. These receiver assemblies 40 may include HCOP and/or PLC receiver coils and/or a coil oriented at right angles to both of these. For depth sounding purposes, HCOP and PLC coils are typically sufficient. The receiver assemblies are located at $r_1, r_2, \ldots r_m$, $42^1$, $42^2$, $42^m$ respectively from the transmitter. If Bx coils were present, they would be located at $rbx_1, rbx_2, \ldots rbx_m$ (not shown).

Figure 5:
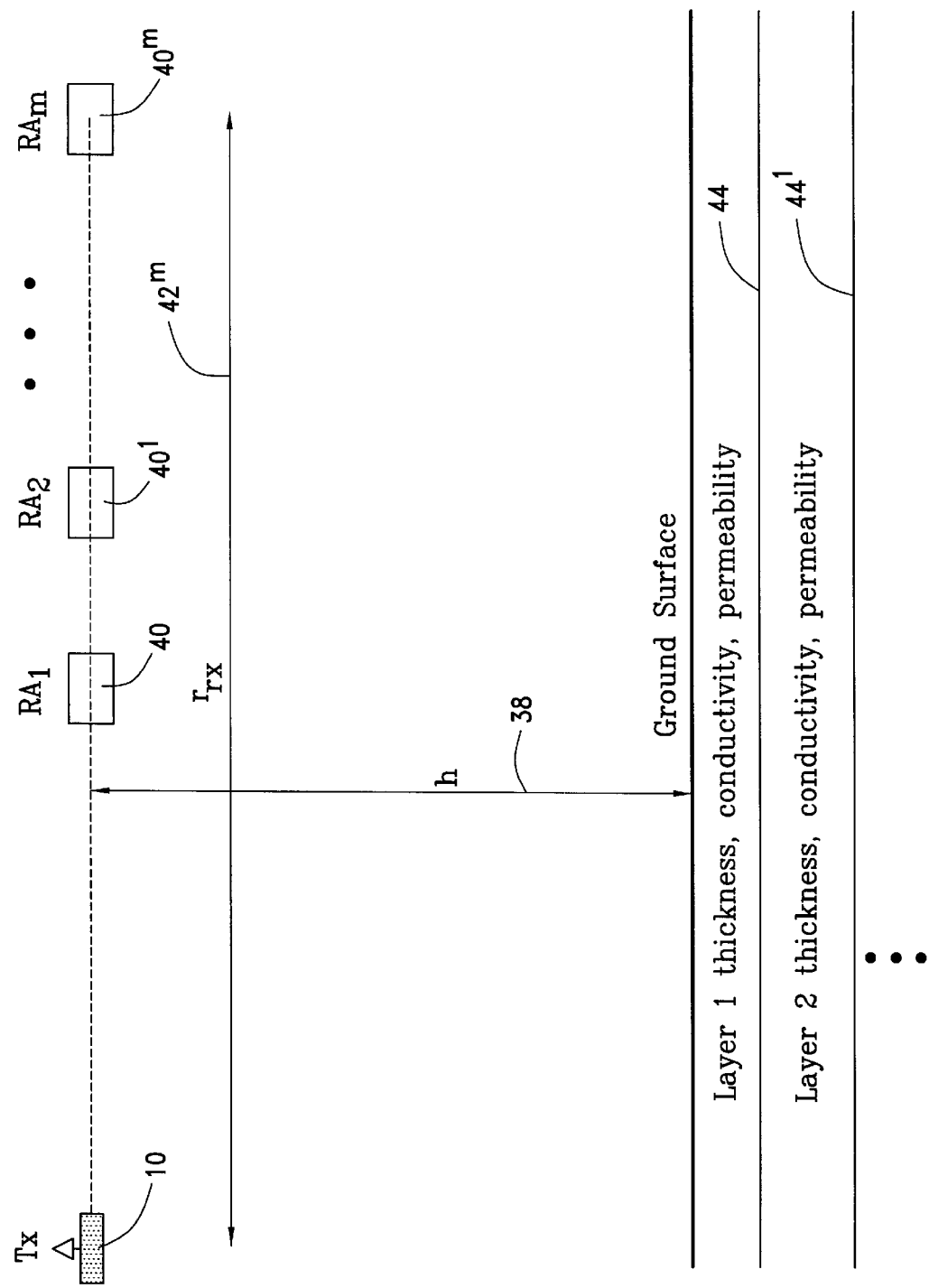
FIG. 5 is a schematic representation of the electromagnetic sensing apparatus of FIG. 4 relative to the ground.

FIG. 5 shows the multiple receiver array of FIG. 4 in relation to a layered earth structure. Each of the Tx-RA pairs samples this structure to a different set of DOI values 44, 44'. Suitable choices of Tx-RA distances yields a sensor which is in principle capable of providing a continuous profile of earth material conductivity depth sections over the range of DOI's provided by the unit as the sensor is moved over the earth's surface.

Figure 6:
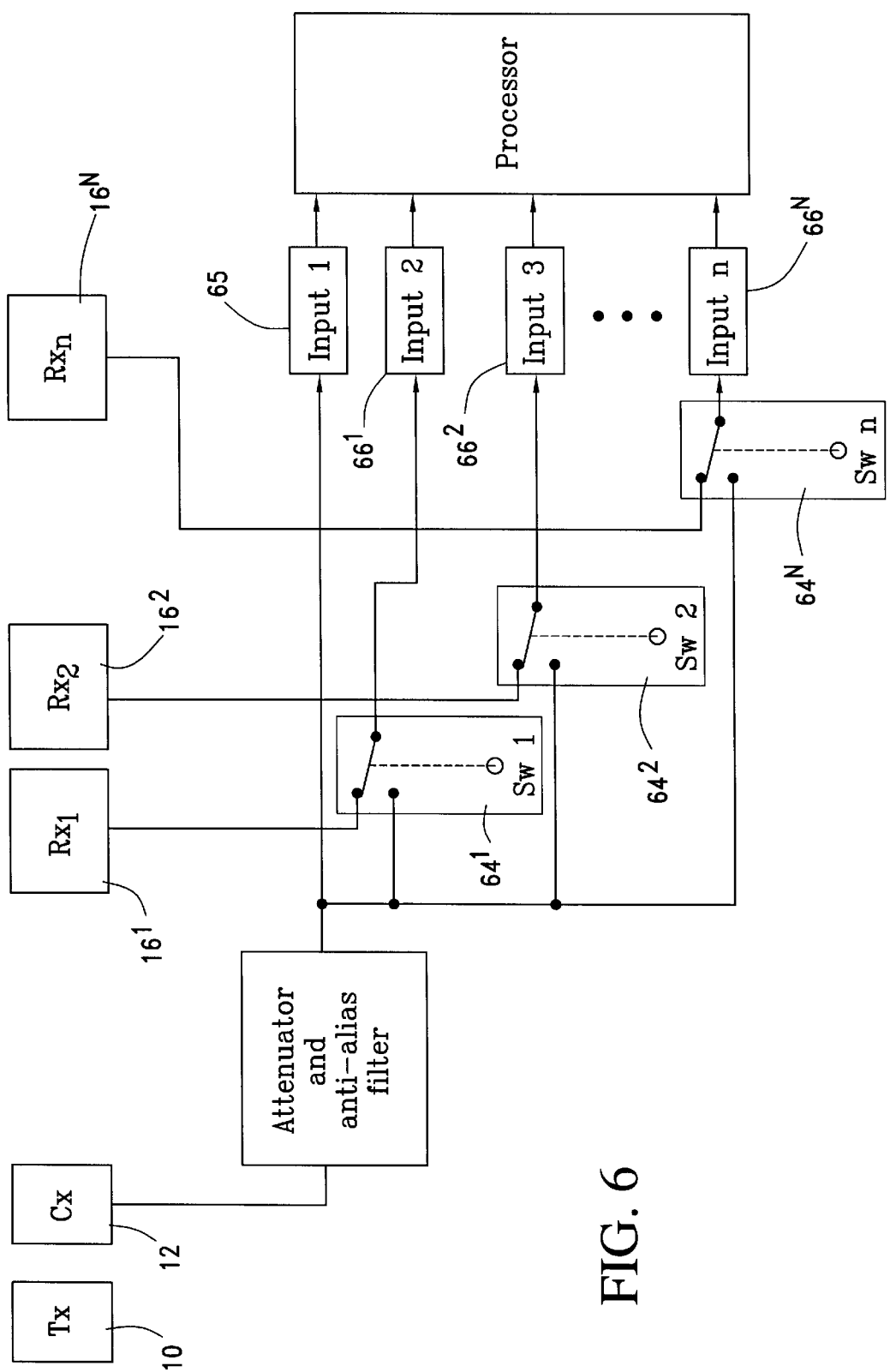
FIG. 6 is simplified circuit diagram of an alternate embodiment of the electromagnetic sensing apparatus of the present invention including a plurality of receivers an switches.

FIG. 6 shows a schematic of a sensing apparatus that includes a plurality of receiver devices 16 which may each be spaced differently from the transmitter. The range of spacings present provides a range of depths of investigation of the apparatus in its depth sounding application. Switches Sw 1 64 to Sw n $64^n$ permit the routing of signals from receiver devices 1 to n to Inputs 2 $66^1$ to n+1 $66^n$ during normal operation, and from the calibration device to one, two or all of Inputs 1 to n+1 so that the relevant Input may be calibrated relative to Input 1 65.

Figure 7:
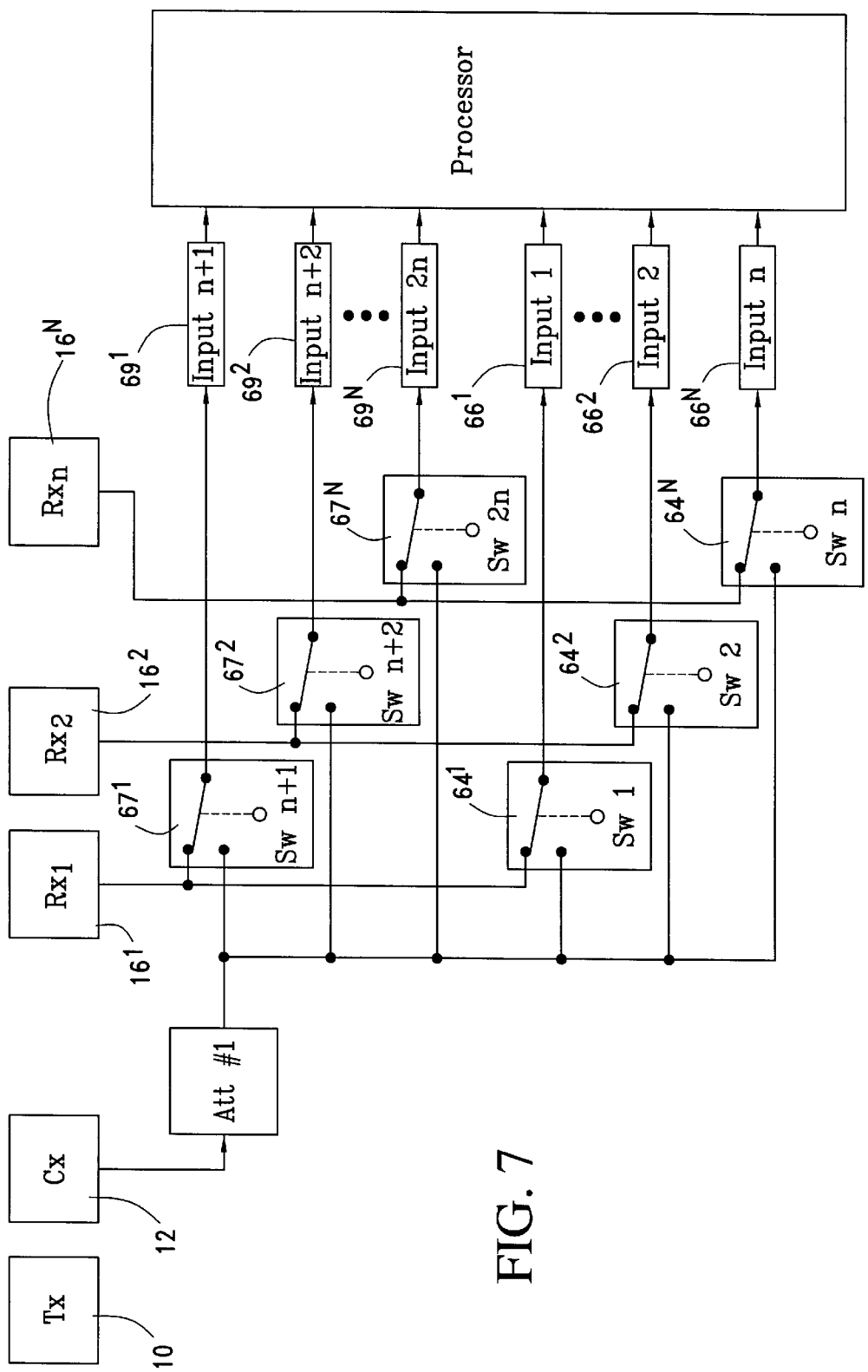
FIG. 7 is simplified circuit diagram of an alternate embodiment of the electromagnetic sensing apparatus of the present invention similar to that shown in FIG. 6 but also including a plurality of inputs for the calibration signal and a plurality of switches.

FIG. 7 is a schematic similar to the shown in FIG. 6 but is enhanced through the addition of a plurality of receiver devices which may each be spaced differently from the transmitter. The range of spacings present provides a range of depths of investigation of the apparatus in its depth sounding application. The range of spacings present provides a range of depths of investigation of the apparatus in its depth sounding application. Switches Sw 1 to Sw n 64 permit the routing of signals from receiver devices 1 to n to Inputs 2 to n+1 $66^{2\ to\ n+1}$ during normal operation, and from the calibration device to one, two or all of Inputs 1 to n+1 $66^{1\ to\ n+1}$ so that the relevant Input may be calibrated relative to Input 1 $66^1$. In addition, Switches Sw n+1 to Sw $2n^{671\ to\ 2n}$ permit the corresponding receiver device 1 to n or the calibration signal. The normal operating state would be Sw 1 to Sw n in the up state, and Sw n+1 to Sw 2n in the down state. Inverting Sw 1 to Sw n to the down state substantially simultaneously with switching Sw n+1 to Sw 2n to the up state permits the simultaneous re-routing of the calibration signal from Inputs n+1 to 2n into Inputs 1 to n, while receiver signals 1 to n are re-routed to Inputs n+1 to 2n. This re-routing permits the calibration of Inputs 1 to n with respect to inputs n+1 to 2n without significant loss of receiver signal output. Calibration could also be performed by switching one or more corresponding pairs of Inputs rather than the entire set.

Figure 8:
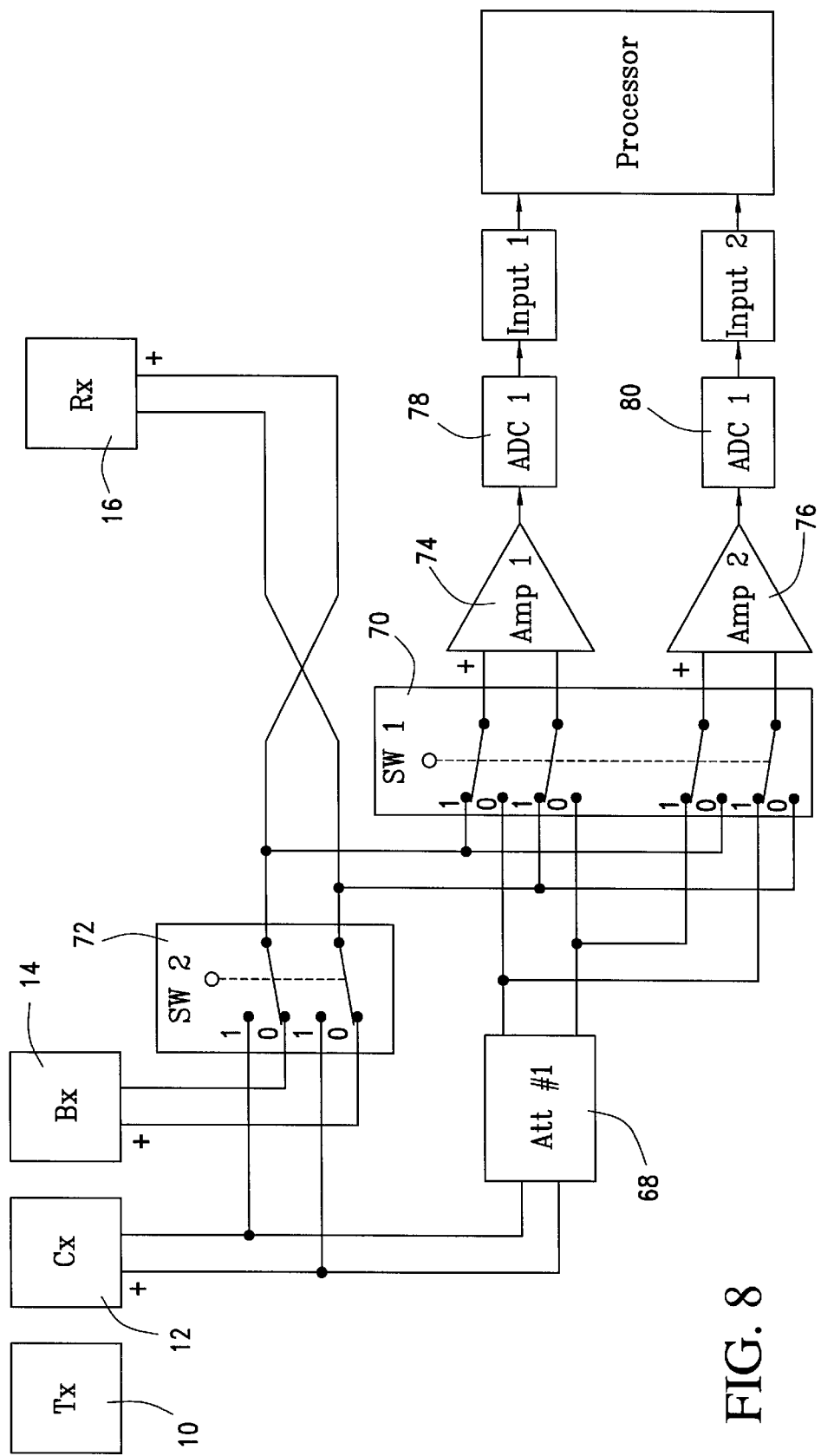
FIG. 8 is a simplified circuit diagram of the electromagnetic sensing apparatus of the present invention showing an alternative embodiment of the calibration technique.

FIG. 8 schematically depicts an alternate embodiment of the calibration apparatus. The Cx coil 12 supplies a signal through an attenuator 68 to certain poles on Switch #1 70 and directly to certain poles on Switch #2 72 Switch #1 70 permits the Cx signal to be routed to either the AMP 1 preamplifier 74 (State 0) or to the AMP 2 preamplifier 76 (State 1). In State 1, the signal from the Rx combined with the signal from Switch #2 (if present) is routed to the AMP 1 preamplifier 74 and thence to anti-alias filters and the ADC 1 78. In State 0, the signal from the Rx (combined with the output of Switch #2, if present) is routed to the AMP 2 preamplifier 76 and thence to anti-alias filters and the ADC 2 80. State 1 may be considered to be the normal state of the circuit, in which the received signal from the Rx (combined with the output of Switch #2, if present) travels through the Signal analog channel and is converted to a digital data stream by the SIG ADC 78, while the Calibration data travels through the Calibration analog channel and is converted to a digital data stream by the CAL ADC 80. When State 0 is selected, the Signal and Calibration signals travel through the Calibration and Signal analog channels and are digitized by the ADC's 1 and 2 (78 and 80), respectively. Switching from State 1 to State 0 thus permits calibration of the Signal analog circuits 74 and ADC 1 78 using the signal from the Cx, while continuing to acquire the signal from the Rx 16 (combined with the output of Switch #2, if present) via the Calibration analog circuits 76 and ADC 2 80. The control circuitry and/or software controlling Switch #1 may swap the digital data streams generated by the ADC's 1 and 2 (78 and 80) in a complementary fashion when the analog data streams are switched between State 1 and State 0, or this complementary switching may be performed during later processing of the digital data streams.

The purpose of this aspect of the calibration apparatus and methodology is to ensure that both the Signal and Calibration analog circuitry and their corresponding ADC's may be calibrated in a symmetrical manner using the Cx signal, and to ensure that negligible SIG data loss occurs during the calibration operation.

If Switch #2 72 is present, a separate pair of leads runs to certain poles on Switch #2 72, which poles are normally open (State 0), but when closed (State 1) place the Cx coil 12 in opposition to the Rx coil 16. If a Bx coil 14 is present and distinct from the Cx coil 12 and if Switch #2 72 is present, its leads run to certain poles on Switch #2 72, which poles are normally closed (State 0) so that the Bx 12 is connected in opposition to the Rx coil 16 for normal operation of the system. State 1 of Switch #2 72 is used for calibration of the Cx coil 12 relative to the Rx coil 16, according to the following methodology. Switch #2 72 may be present in the circuit only during initial calibration of the system, when it may be used to position the Cx 12 and/or Rx 16 coils and/or to adjust the parameters of the Cx 12 and/or Rx 16 coils, such that the combined signal from the Rx and Cx due to direct pickup of the Tx field is at a minimum, This methodology ensures that the Calibration analog signal emanating from the Cx precisely matches the amplitude and phase of the Rx analog signal due to direct pickup of the Tx field.

Figure 9:
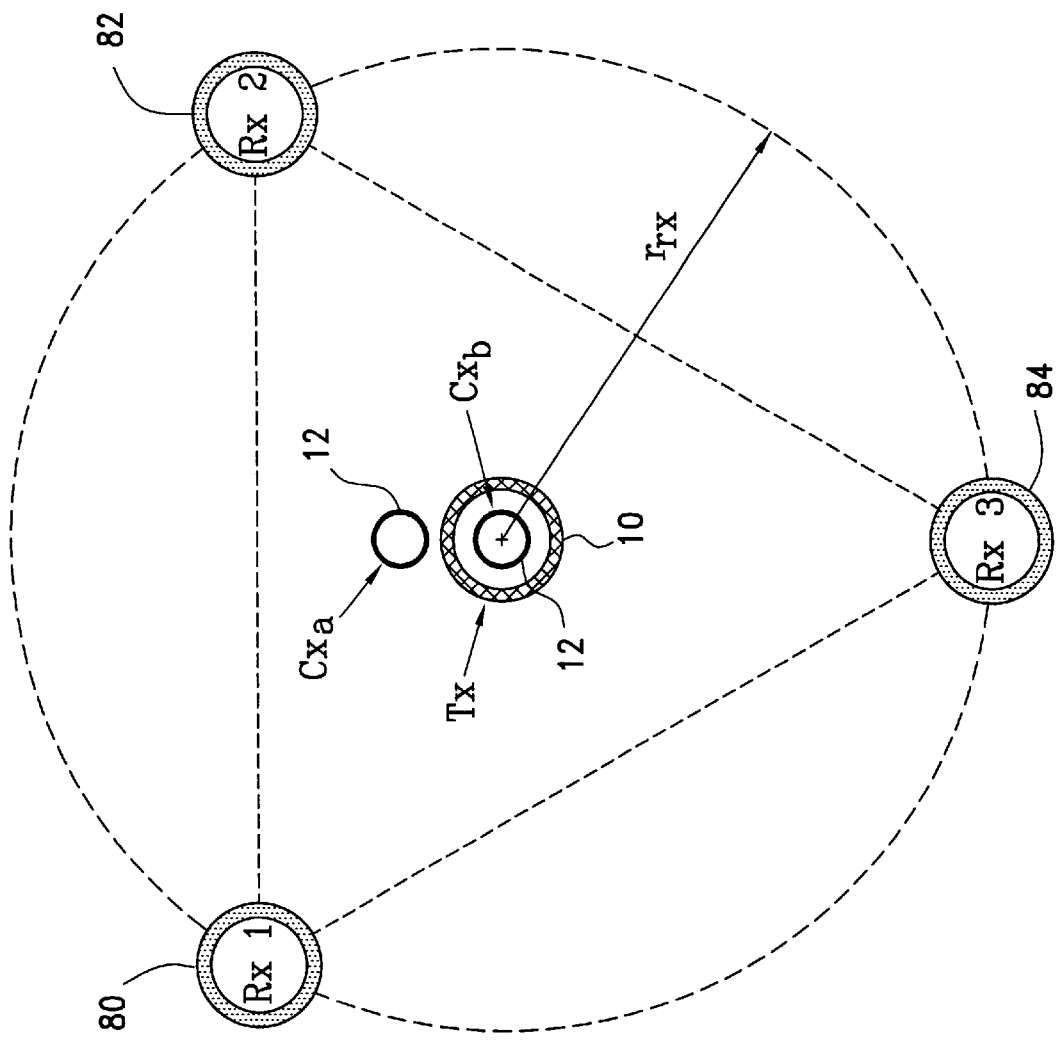
FIG. 9 is a schematic representation in plan view of a two-dimensional three-Receiver Array Conductivity Meter embodiment of the present invention.

FIG. 9 shows a two-dimensional embodiment of the Array Conductivity Meter (ACM) for the case with three Receiver Assemblies (m=3 case) in which the transmitter Tx 10 is located at the center of the array (hatched ring), the three Receiver Assemblies $Rx_1$, $Rx_2$ and $Rx_3$ 80, 82 and 84 respectively are disposed symmetrically at the vertices of an equilateral triangle at distances $r_{rx}$ from the transmitter (large solid rings), and the calibration coil Cx 12 is located in proximity to the Tx, for example at location $CX_a$ between the transmitter Tx and the receiver assemblies or $CX_b$ inside the transmitter.

Figure 10:
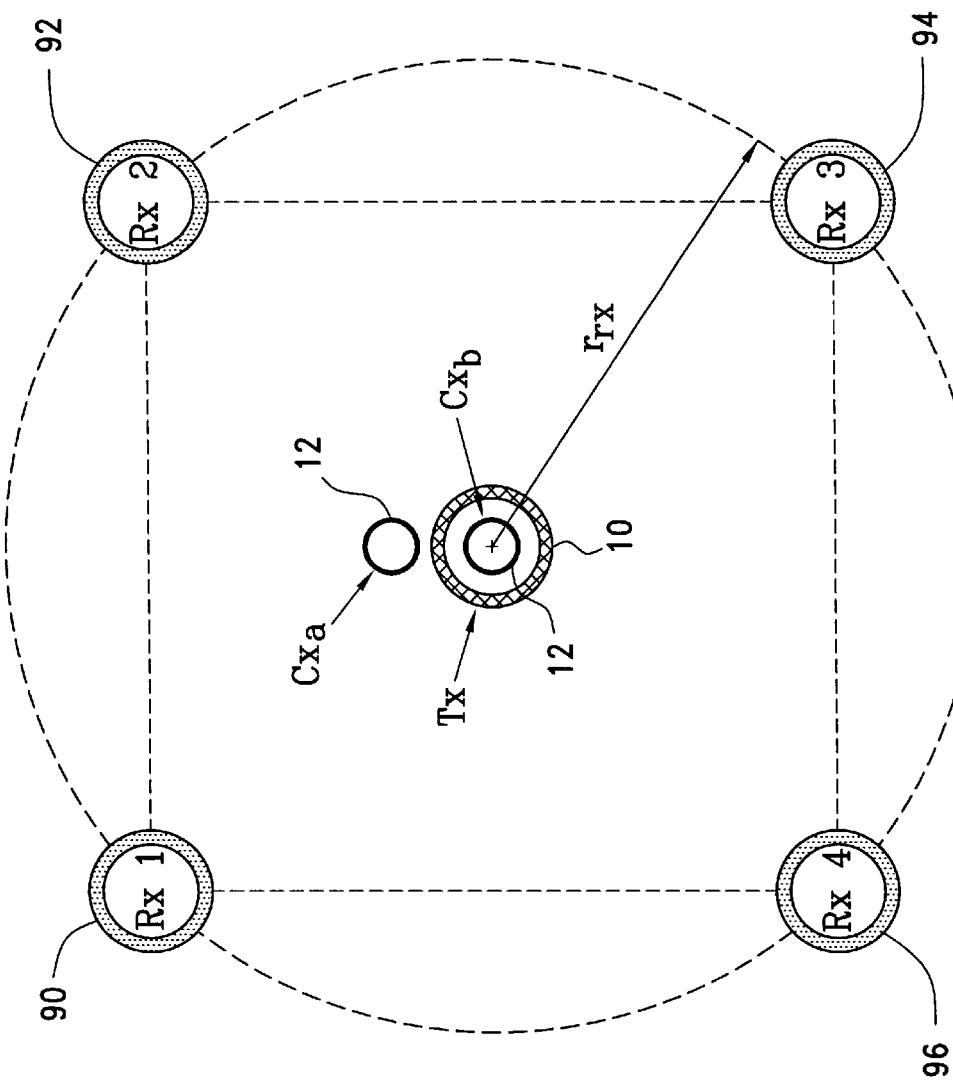
FIG. 10 is a schematic representation in plan view of a two-dimensional four-Receiver Array Conductivity Meter embodiment of the present invention.

FIG. 10 shows a two-dimensional embodiment of the ACM for the case with four Receiver Assemblies (m=4 case) in which the transmitter Tx 10 is located at the center of the array (hatched ring), the four Receiver Assemblies $Rx_1$, $Rx_2$, $Rx_3$ and $Rx_4$ 90, 92, 94 and 96 respectively are disposed symmetrically at the vertices of a square at distances $r_{rx}$ from the transmitter (large solid rings). As with the configuration described above the calibration coil Cx is located in proximity to the Tx, for example at location $CX_a$ outside or $Cx_b$ inside the transmitter 10.

Figure 11:
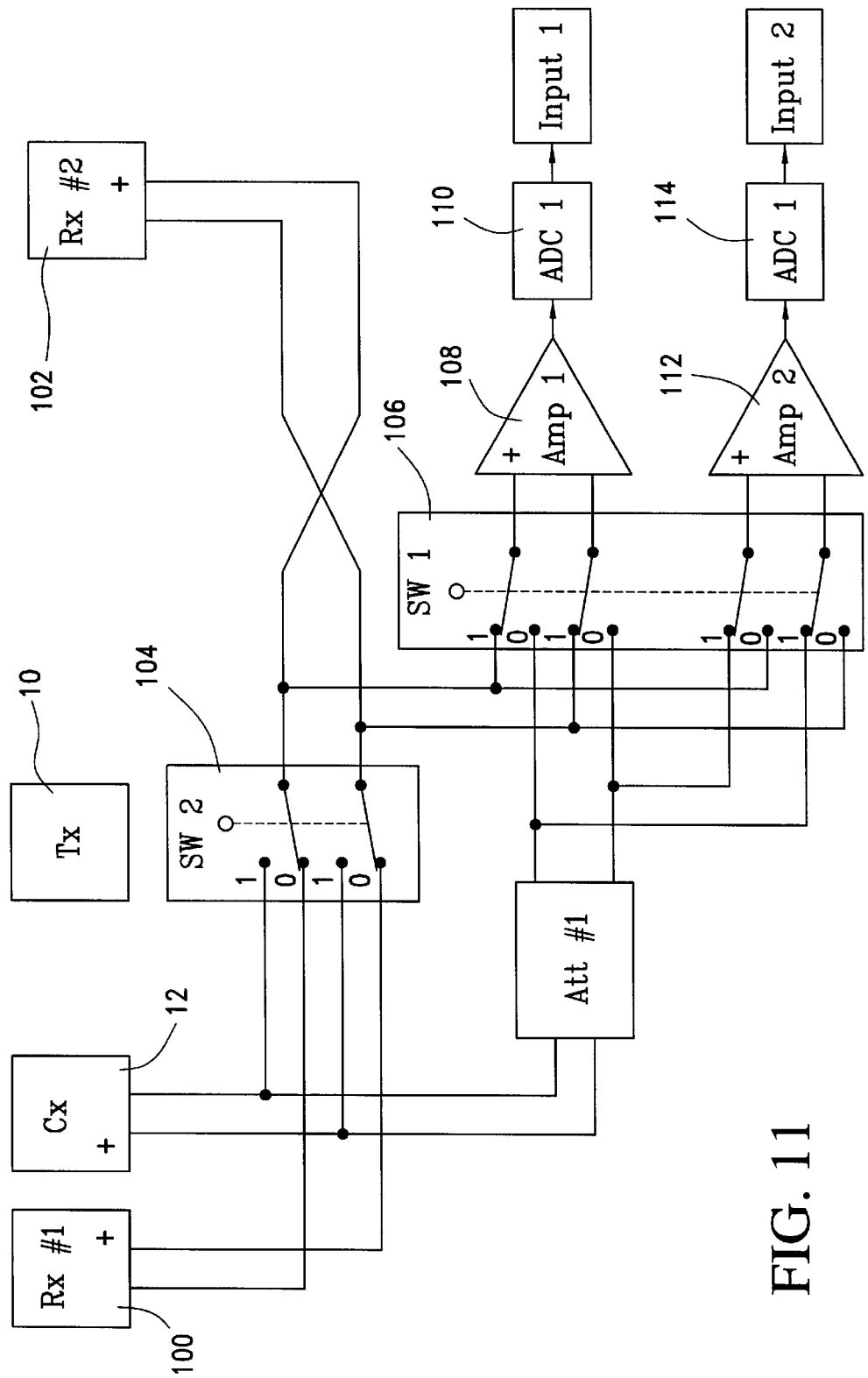
FIG. 11 is a simplified circuit diagram of a two-Receiver Array Conductivity Meter embodiment of the present invention showing the application of the alternative embodiment of the calibration technique to the output-difference mode of this array.

FIG. 11 schematically depicts the application of the alternate embodiment of the modular calibration apparatus for the case of a two-coil ACM showing receiver coils $Rx_1$ 100 and $Rx_2$, 102, a transmitter Tx 10 and a calibration coil Cx 12. In this simplified circuit diagram the two receiver coils 100, 102 are normally connected in opposition via Switch #2 (State 0) 104. State 1 of Switch #1 106 routes the signal output from Switch 2 104 through the Signal preamplifier 108 to the SIG ADC 110, while the Cx signal is routed through the Calibration preamplifier 112 to the CAL ADC 114. State 2 of Switch #1 reverses these signals.

Figure 12:
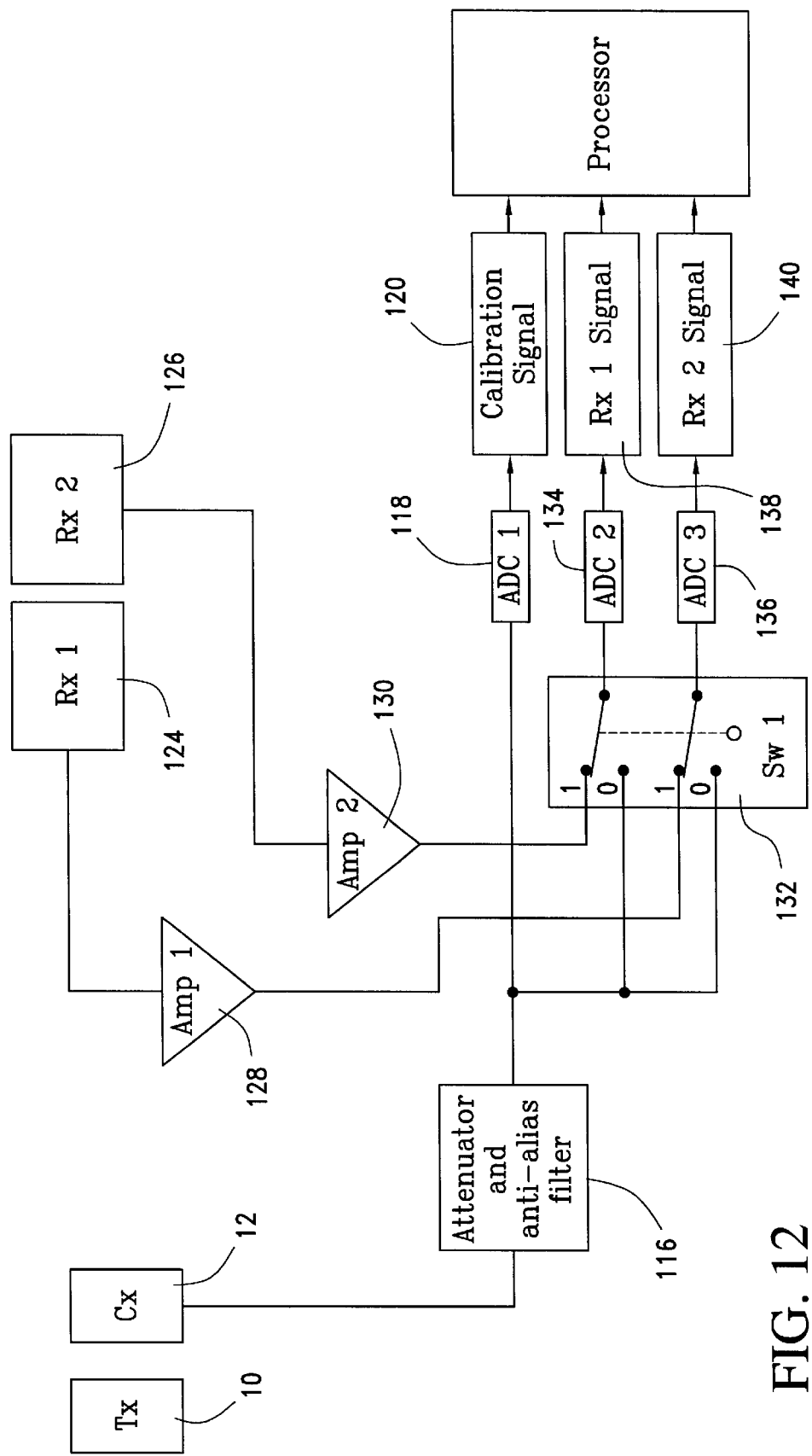
FIG. 12 is a simplified circuit diagram of an alternate embodiment of the electromagnetic sensing apparatus of the present invention similar to that shown in FIG. 2 but showing an alternate switching arrangement.

FIG. 12 shows a schematic of a simplified version of the sensing apparatus wherein the calibration device 12 (Cx) signal passes via attenuator Att #1 116 (which may include anti-alias filters) directly to analog-digital converter ADC 1 118 and thence to Input 1 or calibration signal 120, and also to poles on Sw 1 132. The first receiver device (Rx 1) 124 and the second receiver device (Rx 2) 126 signals pass via preamplifiers Amp 1 128 and Amp 2 130 (which may include anti-alias filters) to a second set of poles on switch Sw 1 132. The output poles of Sw 1 132 connect to analog-digital converters ADC 2 134 and ADC 3 136 and thence to Inputs 2 or Rx 1 signal 138 and input 3 or Rx signal 140, respectively. In this arrangement, ADC/Input channels 2 and 3 receive receiver signals 1 and 2 when Sw 1 is in position 1 (Operate), and may be calibrated using the calibration signal by placing Sw 1 in position 0 (Calibrate) while the calibration signal continues to be monitored by Input 1. This approach permits the calibration of the electronics of ADC 2 and ADC3 and Inputs 2 and 3, respectively, relative to ADC 1 and Input 1. Monitoring of the calibration signal on Input 1 permits the continuous calibration of the system for variations in transmitter signal amplitude and/or phase.

Figure 13:
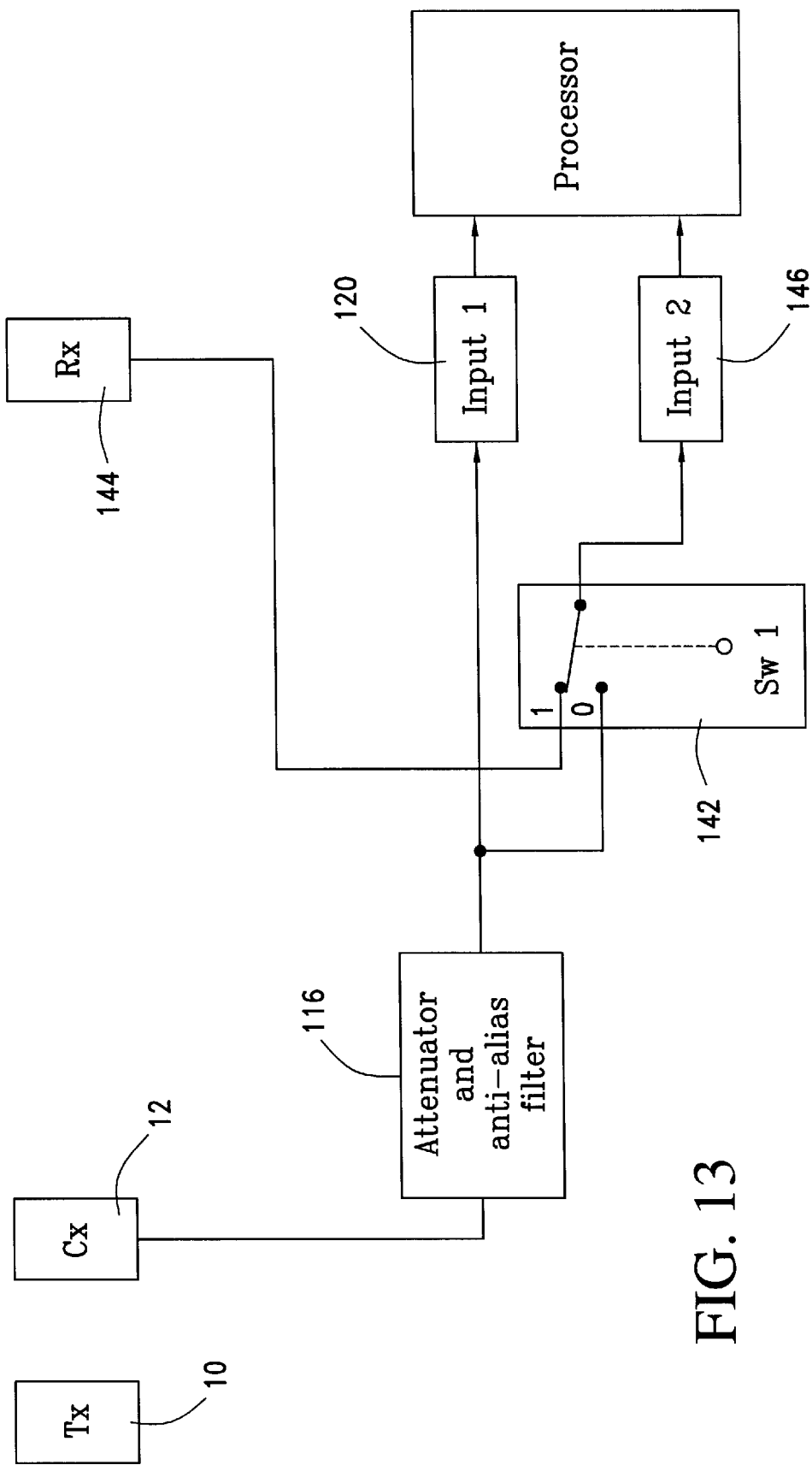
FIG. 13 is a simplified circuit diagram of an alternate embodiment of the electromagnetic sensing apparatus of the present invention similar to that shown in FIG. 2 but showing a simplified switching arrangement.

In FIG. 13, the calibration device 12 Cx signal passes via attenuator Att #1 116 (which may include anti-alias filters)

directly to Input 1 120 (here assumed to include signal conditioners and an analog-digital converter), and also to an input pole on Sw 1 142. The receiver device 144 (Rx) signal is connected to the other input pole of Sw 1 142. The output pole of Sw 1 142 connects to Input 2 146 (here assumed to include signal conditioners and an analog-digital converter.) In Sw 1 position 1 (Operate) the receiver signal is routed by the switch to Input 2. In Sw 1 position 0 (Calibrate) the calibration signal is routed by the switch to Input 2 while continuing to be monitored by Input 1. This approach permits the calibration of Input 2 relative to Input 1. Monitoring of the calibration signal on Input 1 permits the continuous calibration of the system for variations in transmitter signal amplitude and/or phase.

Figure 14:
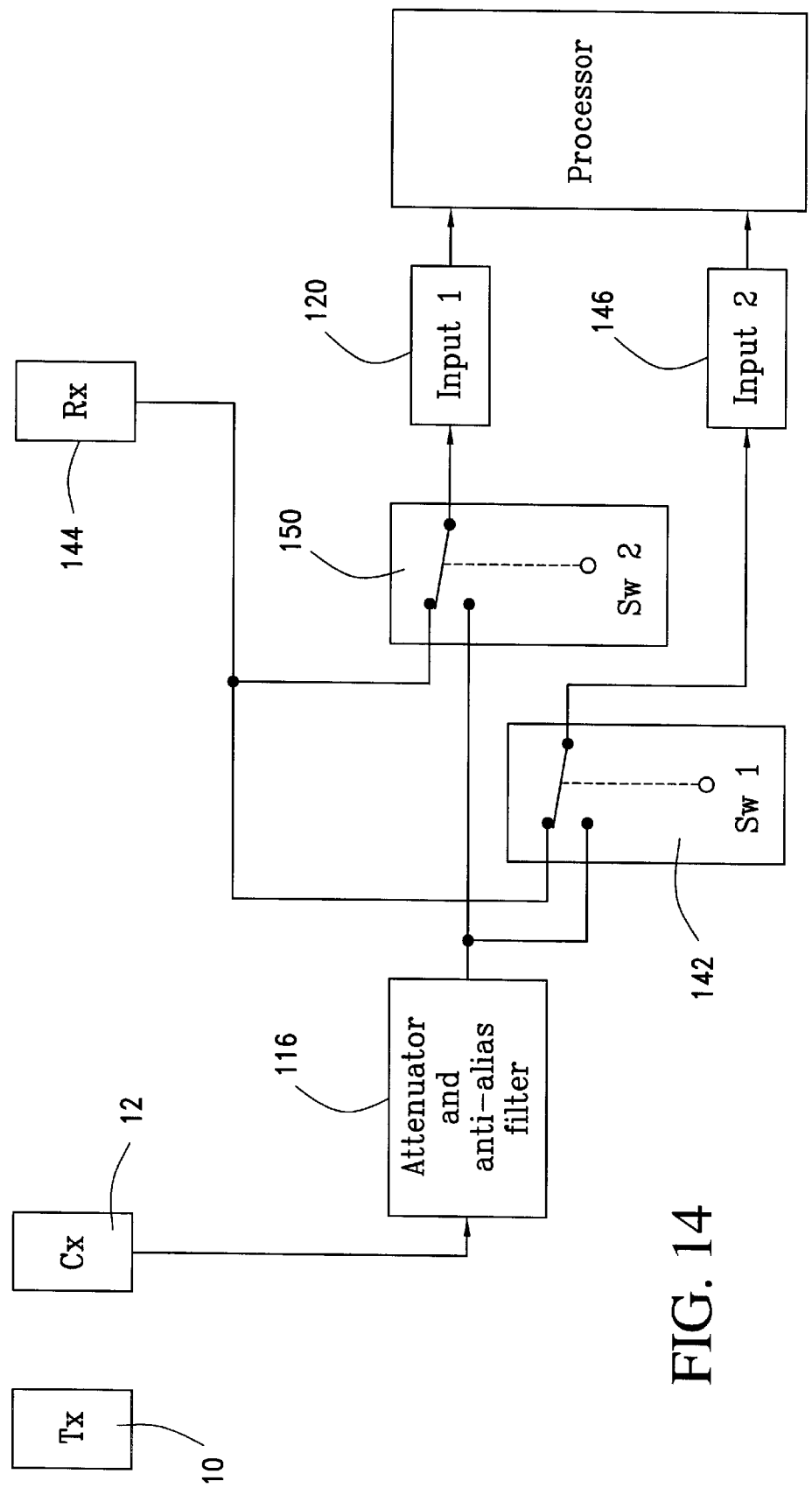
FIG. 14 is a simplified circuit diagram of an alternate embodiment of the electromagnetic sensing apparatus of the present invention similar to that shown in FIG. 13 but showing a modified switching arrangement.

FIG. 14, shows an embodiment which enhances the operation of the embodiment shown in FIG. 13 through the addition of Sw 2 150, which provides a means independent of the state of Sw 1 142 of routing either the calibration signal or the receiver signal to Input 1 120. The normal operating mode would be with Sw 1 142 up and Sw 2 150 down, so that the calibration signal is routed to Input 1 while the receiver signal is routed to Input 2 146. By switching Sw 1 to the down position, the calibration signal is routed through Input 2 in order to calibrate it relative to Input 1. By inverting the normal operating mode by switching Sw 1 down and Sw 2 up substantially simultaneously, the calibration signal can be transferred from Input 1 to Input 2, while simultaneously switching the receiver signal from Input 2 to Input 1. Thus the calibration signal can be applied to one channel at a time without significant loss of receiver signal output.

It will be appreciated by those skilled in the art that these figures describe the major components in the claimed embodiments of the present invention, and that other components, including but not limited to preamplifiers, amplifiers, filters, attenuators, analog-digital converters, and the details of the processing means, may or may not be represented, and that these other components may be located at more than one position in these drawings, such location differences leading to varying tradeoffs in performance, cost and flexibility in the resulting embodiment The Invention The invention consists of apparatus and methodology for improved quantitative measurement of the electromagnetic properties of earth materials. It includes two principal improvements over the state of the art and a number of secondary ones. The principal innovations comprise apparatus and methodology for quantitative calibration of the Secondary Field Coupling Ratio (SFCR) output of electromagnetic sensors (or the analogous time-domain quantity in a time-domain sensor) and apparatus and methodology for estimation of the electromagnetic properties of earth materials using multiple receiver arrays.

1. Calibration

One aspect of the invention provides a means of obtaining a precise amplitude and phase reference for calibration of electromagnetic sensors, and of using this calibration to compute calibrated Secondary Field Coupling Ratios (SFCR's), which are the standard Way to express the strength and phase behaviour of single or multi-frequency electromagnetic sensors. SFCR's must also be computed, at least implicitly, when calibrating the output of time-domain electromagnetic sensors.

Specifically, quantitative calibration of electromagnetic sensors is accomplished through the use of a rigidly mounted Calibration coil (Cx) located in the vicinity of the Transmitter coil (Tx), preferably it is on or near the axis of the transmitter-receiver array. This coil should be wound such that its output arising from the Primary Field transmitted by the Tx closely matches that of a Receiver coil (Rx) which is maximum-coupled to (ie. has the same geometrical configuration as) the Tx at that Rx's final location. The location of all coils is defined to be the geometric center of each coil. The Cx position is then tuned by connecting the Rx in opposition to the Cx and monitoring the difference signal in an environment which generates negligible Secondary Field (ie. arising from eddy currents induced in the environment by the Primary Field) response, The difference signal varies according to the location of the Cx: at the optimal location, the difference signal goes through a minimum. The Cx is then attached permanently to the mounting structure at this location. Alternatively, the Cx can be attached permanently at the outset of the procedure and the Tx or Rx position adjusted slightly to achieve the desired minimum in the difference signal before permanently attaching it to the mounting structure. When this procedure has been completed, the signal from the Cx represents the strength of the Primary Field and is insensitive to variations in Secondary Field signal amplitude or phase (as compared to the Rx) by the cube of the ratio of the distance between the Tx and the Rx to the distance between the Tx and Cx. A desired degree of sensitivity to a given maximum secondary field level in the calibration signal can be achieved by designing the Cx effective area to be smaller than that of the Rx by the desired sensitivity ratio and then mounting it at the appropriate distance (the cube root of the ratio of the effective areas of the Cx and the Rx, multiplied by the Tx-Rx distance) from the Tx.

The Rx signal incorporates signals due to the Secondary Field and to the Primary Field. The Rx and Cx signals are digitized and may be digitally filtered, before computation of the Discrete or Fast Fourier transform is performed to yield complex (i.e. real and imaginary) components at one or more frequencies of each signal, known as the Signal and Calibration, respectively. The complex ratio of the Signal to the Calibration at the frequency under consideration is multiplied by three factors, the first relating to the complex ratio of the transfer functions of the preamplifier, amplifier, filters and analog to digital converters between the Signal and Calibration electronic channels at the frequency under consideration, the second to the effective areas of the Cx, Rx and Bx (if present), and the third to the cubed ratio of the Tx-Rx distance to the Tx-Cx distance.

The transfer function ratio between the Signal and Calibration electronic channels is estimated by switching the Cx signal into each Signal electronic channel using an appropriate switch or electronic switching network while continuing to monitor the Cx signal through the Calibration electronic channel, Fourier-transforming the two signals, and computing the complex ratio of each Cx-via-Signal frequency component to the corresponding Calibration frequency component. By maintaining an extra Signal electronic channel through which any displaced Rx signal can be digitized, or by simply swapping the Rx and Bx signals in a single-receiver system, the transfer function ratios at for each Signal channel can be determined relative to the Calibration channel at each frequency under consideration.

Improvements in this aspect of the calibration method and apparatus over the state of the art include:

the use of electronic or switch switching to achieve effectively continuous digitisation of all data channels, which minimises the loss of data and so maximises the quantity of information obtained per unit of energy expended in the EM transmitter, and the availability of explicit formulas for conversion of the Signal and Calibration measurements into the SFCR's.

The availability of continuous Calibration information during the measurement is an improvement on methods in which the Calibration is sampled at intervals.

Precise values of the transfer functions may be obtained during the measurement without significant loss of data. This ensures that errors in the SFCR's due to temporal or thermally-induced changes in the transfer functions of the Calibration or Signal channels are reduced to negligible levels.

Variations in Tx output amplitude or phase are automatically eliminated from the SFCR's by this technique on a continuous basis. Conventional HEM sensors or signal processors, and some other MEMS and TCM's, incorporate no means of compensating for such variations on a dynamic basis and must rely on the stability or regulation of the transmitter circuit and receiver circuitry themselves.

2. Multiple-Receiver Arrays

Another aspect of the invention exploits the observation that adding multiple receiver elements to a self-contained EM sounding instrument need not add significantly to the instrument's power consumption. The inclusion of multiple EM receivers set up as an array relative to an EM transmitter yield considerable additional information about the distribution of earth materials properties in the vicinity of the array.

Case 1: Depth Sounding

For depth sounding, the DOI below the EM sensor for each value of Tx-Rx coil separation or $R_{rx}$ 30 (shown in FIG. 1) or $r_1$ $42^1$ (shown in FIG. 4) in the array is strongly related to this separation. This effect is most easily exploited in the Low Induction Number regime, i.e. when all coil separations are smaller than one-third of the average electromagnetic skin depth in the near-surface materials, although the benefits do persist at declining levels to larger values of coil separation and/or sensor height. In the Low Induction Number regime, as noted during the description of the prior art, the rule-of-thumb DOI for the HCOP configuration is 1.5 times the Tx-Rx separation, while the DOI for the PLC is 0.5 times the Tx-Rx separation. For example, including multiple receiver assemblies as indicated in FIG. 4 yields m DOI's of 1.5 $r_1$, 1.5 $r_2$, . . . 1.5 $r_m$ when HCOP receiver coils are included in the receiver assemblies, and m DOI's of 0.5 $r_1$, 0.5 $r_2$, . . . 0.5 $r_m$ when PLC receiver coils are included in the receiver assemblies. These multiple DOI's provide mutually independent information about the conductivity structure of earth materials in the vicinity of the sensor array, which can be interpreted using a variety of techniques to yield an approximate image of the conductivity structure. Such interpretation can be performed in real time for use by an operator or as an input to a process or machine.

Case 2: Gradient or Gradient/Sounding Arrays

For enhanced detection of regions of anomalous earth materials properties in the vicinity of the array, multiple receiver assemblies may be disposed symmetrically about the transmitter. In the simplest case, pairs of Receiver Assemblies (for m=2, 4, 6, . . . ) could be located at symmetrical distance increments to either side of the transmitter. Such an array could be moved perpendicular to its long axis to search a swath for gradient anomalies in earth material conductivities. Additional receiver assemblies could be added at the vertices of a polygon centered on the transmitter to Improve a real coverage of the array (eg FIGS. 9–10). For even values of the receiver assembly count m, symmetrical elements of the array may be directly connected in opposition and their combined outputs processed electronically (see FIG. 11) or their processed outputs may be differenced after acquisition (see FIG. 11). Note that if the receiver assembly count m is an odd number (eg FIG. 9). direct connection in opposition is not an option.

The direct-connection approach, in which only the difference signal between a given pair of coils is amplified, acquired and processed, yields a wider dynamic range, since most common EM noise sources such as sferics (arising from distant lightning strokes) and power line interference tend to be relatively uniform over practical array dimensions ranging from fractional meters to say ten meters.

The parallel-acquisition approach is more flexible and diagnostic, and may be implemented without major losses in dynamic range if high precision ADC's are used for data acquisition of each receivers output. Parallel-acquisition also permits depth sounding data to be acquired along the swath covered by the array at DOI's dictated by the Tx-Rx separation and the receiver coil configuration(s) in each Receiver Assembly.

The calibration methodology described above can be readily applied to this geometry, using a Cx coil located either inside or outside of the Tx (eg at locations $Cx_a$ or $Cx_b$ in FIGS. 9–10)

It will be appreciated by those skilled in the art that these two aspects of the present invention can have wide applications and can be incorporated into a wide variety of electromagnetic systems. The following are some examples of the application of the present invention:

EM sensors, in which the transmitter coil(s), calibration coil(s), receiver coils(s) and bucking coil(s) are integrated into the wing of an aircraft made of nonconductive composite materials;

Calibration using transmitter current monitors rather than magnetic field pickup via Cx coils;

Temperature-based compensation for baseline drift;

EM signal processor architecture;

Application of inversion methods to multiple-receiver data for conductivity-depth section construction; and Method for improved estimation of the thickness and conductivity of a layer of moderate conductivity overlying a more conductive layer of known conductivity (theoretical development not included here at this point).

It will be appreciated that the above description relates to the invention by way of example only. Many variations on the invention will be obvious to those skilled in the art and such obvious variations are within the scope of the invention as described herein whether or not expressly described.

What is claimed as the invention is:

1. An electromagnetic sensing apparatus comprising:
   an electromagnetic transmitter for generating a transmitter field;
   at least one receiver device spaced from the transmitter for sensing a receiver local electromagnetic field proximate thereto and generating a receiver signal, wherein the receiver local electromagnetic field includes the transmitter field and a receiver secondary field induced by the transmitter field;
   at least one calibration device for sensing a calibration local electromagnetic field proximate thereto and generating a calibration signal, wherein the calibration local electromagnetic field includes the transmitter field and a calibration secondary field induced by the transmitter field, the calibration device being positioned such that the distance between the transmitter and the receiver device is greater than the distance between the transmitter and the calibration device;

a switch connected between the at least one receiver device and the at least one calibration device for selecting one of the receiver signal and the calibration signal; and a processing means having a first input for receiving a signal from one of the receiver device and the calibration device and a second input for receiving a signal from the switch.

2. An electromagnetic sensing apparatus as claimed in claim 1 wherein the transmitter has a transmitter axis, the receiver device has a receiver axis and the calibration device has a calibration axis and the transmitter axis, receiver axis and the calibration axis are generally parallel.

3. An electromagnetic sensing apparatus as claimed in claim 2 wherein the transmitter has a transmitter effective center, the receiver device has a receiver effective center and the calibration device has a calibration effective center and the transmitter effective center, the receiver effective center and the calibration effective center are generally in the same plane.

4. An electromagnetic sensing apparatus as claimed in claim 3 wherein the transmitter effective center, the receiver effective center and the calibration effective center are generally arranged along a line.

5. An electromagnetic sensing apparatus as claimed in claim 4 wherein the at least one receiver device is a first receiver device and further including a second receiver device having a second receiver axis generally aligned with the transmitter effective center and the second receiver device senses a second receiver local electromagnetic field proximate thereto and generates a second receiver signal and wherein the processing means further includes a third input which receives the second receiver signal.

6. An electromagnetic sensing apparatus as claimed in claim 5 further including a second switch connected between the second receiver and the at least one calibration device and the third input is connected to the second switch.

7. An electromagnetic sensing apparatus as claimed in claim 6 wherein the second receiver is proximate to the first receiver.

8. An electromagnetic sensing apparatus as claimed in claim 1 wherein the at least one receiver device is a first receiver device having a first receiver axis and further including a second receiver device having a second receiver axis generally orthogonal to the first receiver axis and the second receiver device senses a second receiver local electromagnetic field proximate thereto and generates a second receiver signal and wherein the processing means further includes a third input which receives the second receiver signal.

9. An electromagnetic sensing apparatus as claimed in claim 8 wherein the second receiver is proximate to the first receiver.

10. An electro magnetic sensing apparatus as claimed in claim 1 wherein the at least one receiver device is a first receiver device and further including a second receiver device spaced from the transmitter and the distance between the first receiver device and the transmitter is less than the distance between the second receiver device and the transmitter, the second receiver device senses a second receiver local electromagnetic field proximate thereto and generates a second receiver signal and wherein the processing means further includes a third input which receives the second receiver signal.

11. An electromagnetic sensing apparatus as claimed in claim 10 wherein the transmitter has a transmitter axis, the first receiver device has a first receiver axis, the second receiver device has a second receiver axis and the calibration device has a calibration axis and the transmitter axis, the first receiver axis, the second receiver axis and the calibration axis are generally parallel.

12. An electromagnetic sensing apparatus as claimed in claim 1 further includes a plurality of spaced apart receiver devices each for sensing a receiver local electromagnetic field proximate thereto and for generating a receiver signal and wherein each receiver signal is connected to the processing means.

13. An electromagnetic sensing apparatus as claimed in claim 12 wherein the processing means further includes a plurality of inputs corresponding to the plurality of receivers and each input is connected to the receiver signal.

14. An electromagnetic sensing apparatus as claimed in claim 12 further including a plurality of switches each switch connected between the calibration device and one of the plurality of receiver devices and wherein the processing means further includes a plurality of inputs each connected to one of the plurality of switches.

15. An electromagnetic sensing apparatus as claimed in claim 12 wherein each receiver device has an effective center and the effective centers of each receiver device are in the same plane.

16. An electromagnetic sensing apparatus as claimed in claim 15 wherein the plurality of receiver devices are three receiver devices each at the vertex of an equilateral triangle.

17. An electromagnetic sensing apparatus as claimed in claim 16 wherein the transmitter is equidistant from each receiver.

18. An electromagnetic sensing apparatus as claimed in claim 15 wherein the plurality of receiver devices are four receiver devices each at the vertex of a square.

19. An electromagnetic sensing apparatus as claimed in claim 18 wherein the transmitter is equidistant from each receiver.

20. An electromagnetic sensing apparatus as claimed in claim 1 wherein the first input receives a signal from the calibration signal.

21. An electromagnetic sensing apparatus as claimed in claim 1 wherein each of the transmitter, the at least one receiver device and the at least one calibration device is a coil.

22. An electromagnetic sensing apparatus as claimed in claim 21 wherein the coil of the calibration device is inside the coil of the transmitter.

23. An electromagnetic sensing apparatus as claimed in claim 1 further including a bucking device for sensing a bucking local electromagnetic field proximate thereto and generating a bucking signal, the bucking device being positioned such that the distance between the transmitter and the receiver device is greater than the distance between the transmitter and the bucking device, the bucking device is connected to the at least one receiver device and wherein the at least one receiver generates a primar receiver signal and the receiver signal is a combination of the bucking signal and the primary receiver signal.

24. An electromagnetic sensing apparatus as claimed in claim 23 wherein the bucking device is positioned such that a component of the bucking signal deriving from the transmitter signal is equal to a component of the primary receiver signal deriving from the transmitter signal and the receiver signal is the bucking signal subtracted from the primary receiver signal.

25. An electromagnetic sensing apparatus as claimed in claim 1 further including a second switch connected between the at least one receiver device and the at least one calibration device and the first input receives a signal from the second switch.

26. An electromagnetic sensing apparatus as claimed in claim 1 wherein the at least one receiver device is a first receiver device and the receiver signal is a first vector component and further including a second receiver for sensing a second receiver local electromagnetic field proximate thereto and generates a second receiver signal which is a second vector component and wherein the processing means further includes a third input which receives the second receiver signal.

* * * * *